(12) United States Patent
Shimada et al.

(10) Patent No.: US 12,431,286 B2
(45) Date of Patent: Sep. 30, 2025

(54) MULTILAYER CERAMIC CAPACITOR INCLUDING RAISED PORTIONS THICKER FROM MIDDLE PORTION TOWARDS OUTER PERIPHERY

(71) Applicant: Murata Manufacturing Co., Ltd., Nagaokakyo (JP)

(72) Inventors: Yasuyuki Shimada, Nagaokakyo (JP); Akira Tanaka, Nagaokakyo (JP); Shinichi Kokawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 18/625,322

(22) Filed: Apr. 3, 2024

(65) Prior Publication Data

US 2024/0266111 A1  Aug. 8, 2024

Related U.S. Application Data

(63) Continuation of application No. 17/479,055, filed on Sep. 20, 2021, now Pat. No. 11,967,461.

(30) Foreign Application Priority Data

Sep. 24, 2020  (JP) .................................. 2020-160019

(51) Int. Cl.
*H01G 4/012* (2006.01)
*H01G 4/232* (2006.01)
*H01G 4/30* (2006.01)

(52) U.S. Cl.
CPC ............. *H01G 4/012* (2013.01); *H01G 4/232* (2013.01); *H01G 4/30* (2013.01)

(58) Field of Classification Search
CPC .......... H01G 4/012; H01G 4/232; H01G 4/30; H01G 4/0085; H01G 4/1227
See application file for complete search history.

(56) References Cited

PUBLICATIONS

Shimada et al., "Multilayer Ceramic Capacitor Including Raised Portions Thicker From Middle Portion Towards Outer Periphery", U.S. Appl. No. 17/479,055, filed Sep. 20, 2021.

*Primary Examiner* — Timothy J. Dole
*Assistant Examiner* — Daniel M Dubuisson
(74) *Attorney, Agent, or Firm* — Keating & Bennett, LLP (57) ABSTRACT

A multilayer ceramic capacitor includes a multilayer body including dielectric layers and internal electrodes alternately laminated therein, and two end surfaces opposing each other in a length direction, and two side surfaces opposing each other in a width direction, and two external electrodes respectively on the two end surfaces of the multilayer body. At least one of two opposed main surfaces of the multilayer ceramic capacitor includes raised portions provided respectively on one side and another side with a middle portion of the main surface interposed therebetween. The raised portions are each raised to become thicker in the lamination direction from the middle portion toward an outer periphery of the main surface.

19 Claims, 9 Drawing Sheets

MULTILAYER CERAMIC CAPACITOR INCLUDING RAISED PORTIONS THICKER FROM MIDDLE PORTION TOWARDS OUTER PERIPHERY

CROSS REFERENCE TO RELATED APPLICATIONS

This application claims the benefit of priority to Japanese Patent Application No. 2020-160019 filed on Sep. 24, 2020. The entire contents of this application are hereby incorporated herein by reference.

BACKGROUND OF THE INVENTION

1. Field of the Invention

The present invention relates to a multilayer ceramic capacitor.

2. Description of the Related Art

Recently, a large-capacitance and small multilayer ceramic capacitor has been required. Such a multilayer ceramic capacitor includes a structure in which external electrodes are respectively provided at both ends of a multilayer body in which layered dielectrics and internal electrodes are alternately laminated.

The internal electrodes have opposing portions, each of which faces opposing portions of the adjacent internal electrodes in the lamination direction, and lead-out portions, each of which is connected to one of the external electrodes in the longitudinal direction from the opposing portion. Here, the directions in which the lead-out portions are drawn out are alternated between the adjacent internal electrodes. Furthermore, there is no electrode in the portions of the side gaps on both sides in the width direction of the opposing portions.

Therefore, the multilayer ceramic capacitor includes thinner outer peripheral regions of the opposing portions in the laminating direction, as compared with the region in which the opposing portions are laminated (see, for example, Japanese Unexamined Patent Application Publication No. 2019-9463).

However, when the thickness in the lamination direction of the outer peripheral region in the multilayer ceramic capacitor is reduced, the posture of the multilayer ceramic capacitor at the time of mounting on a board becomes unstable.

SUMMARY OF THE INVENTION

Preferred embodiments of the present invention provide multilayer ceramic capacitors in each of which a posture thereof during mounting on a board is stable.

A preferred embodiment of the present invention provides a multilayer ceramic capacitor that includes a multilayer body including a plurality of dielectric layers and a plurality of internal electrodes alternately laminated therein, and two end surfaces opposing each other in a length direction which intersects a lamination direction, and two side surfaces opposing each other in a width direction which intersects the lamination direction and the length direction, and two external electrodes respectively on the two end surfaces of the multilayer body, wherein at least one of two opposed main surfaces of the multilayer ceramic capacitor in the lamination direction includes raised portions respectively on one side and another side with a middle portion of the main surface interposed therebetween, the raised portions each being raised to become thicker in the lamination direction from the middle portion toward an outer periphery of the main surface.

According to preferred embodiments of the present invention, it is possible to provide multilayer ceramic capacitors in each of which a posture at a time of mounting on a board is stable.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

Figure 1:
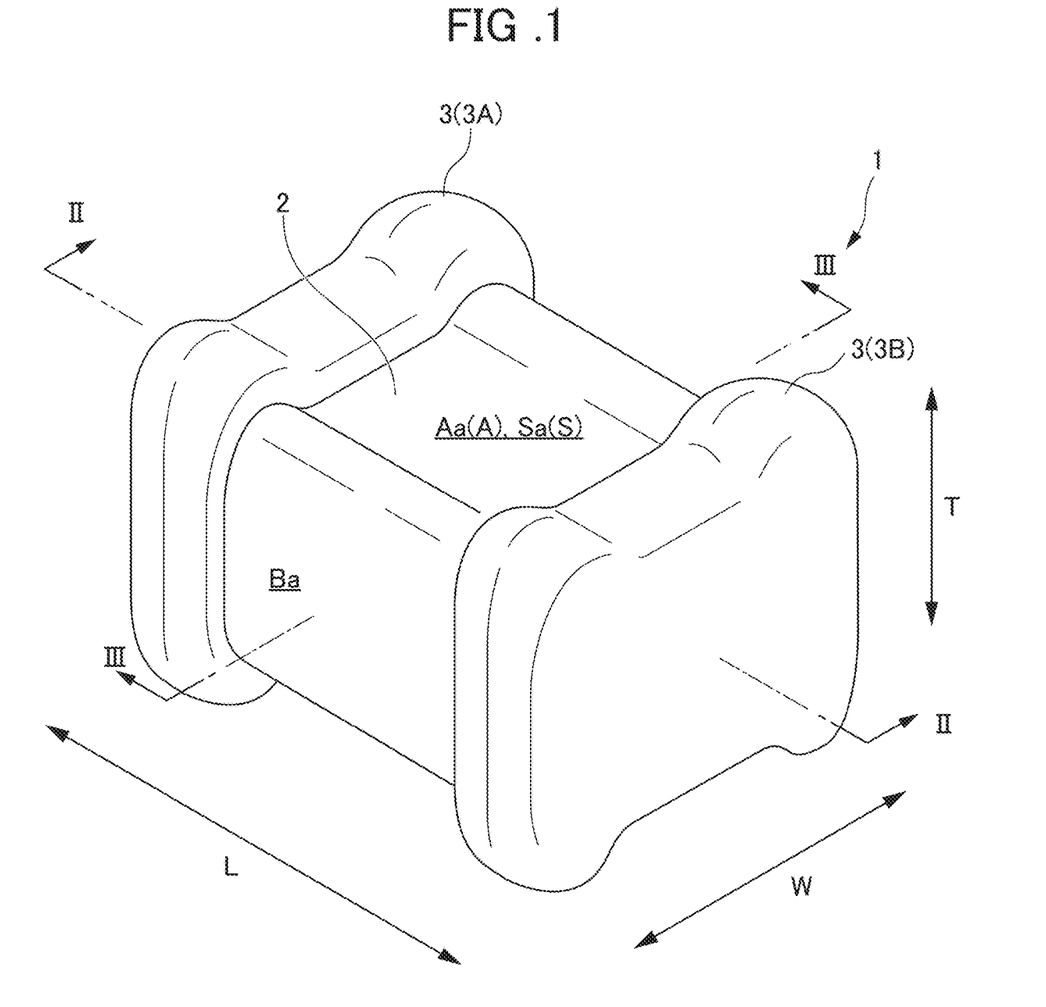
FIG. 1 is a schematic perspective view of a multilayer ceramic capacitor 1 according to a preferred embodiment of the present invention.
Figure 2:
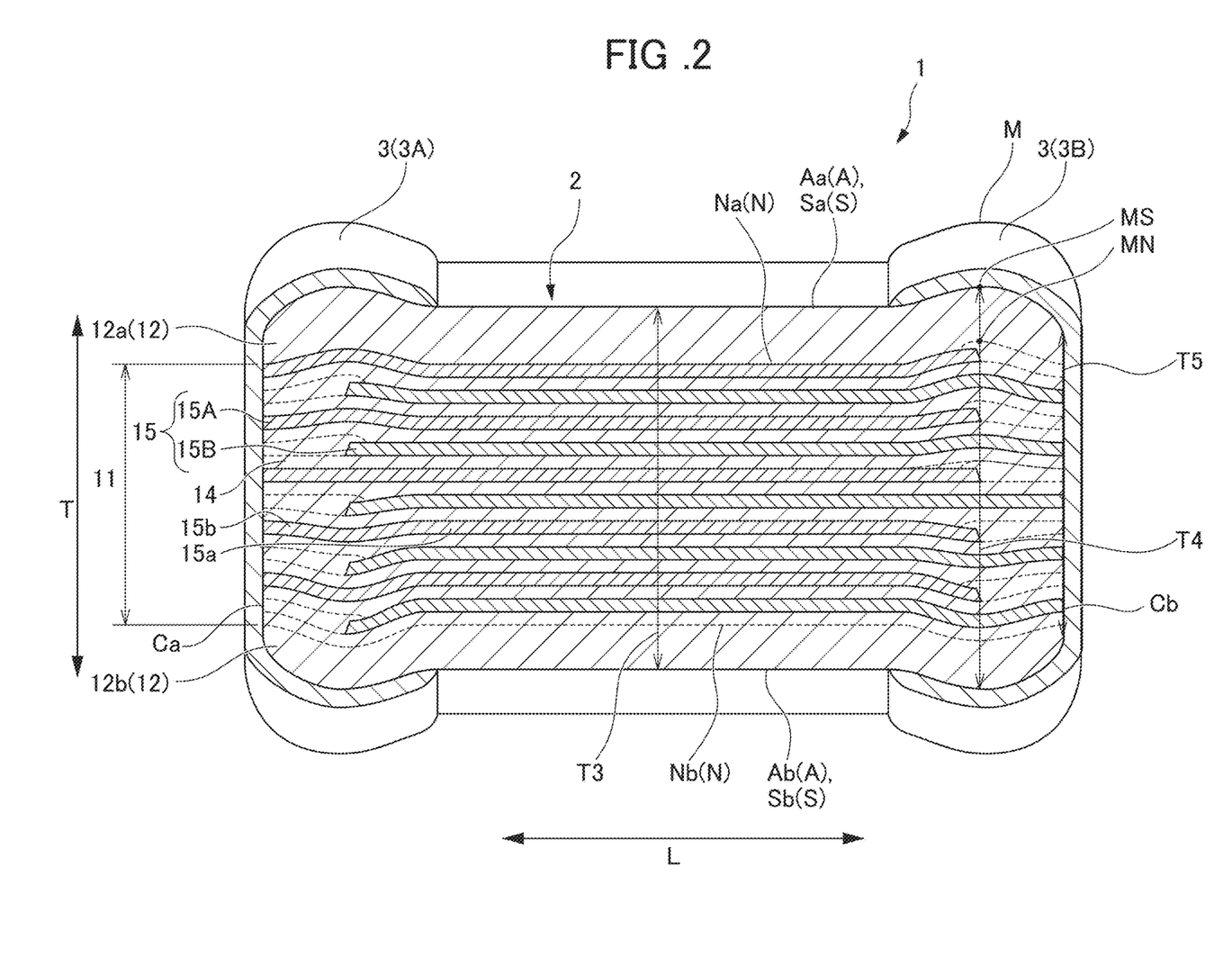
FIG. 2 is a cross-sectional view taken along the line II-II in FIG. 1 of a multilayer ceramic capacitor 1 of a preferred embodiment of the present invention.
Figure 3:
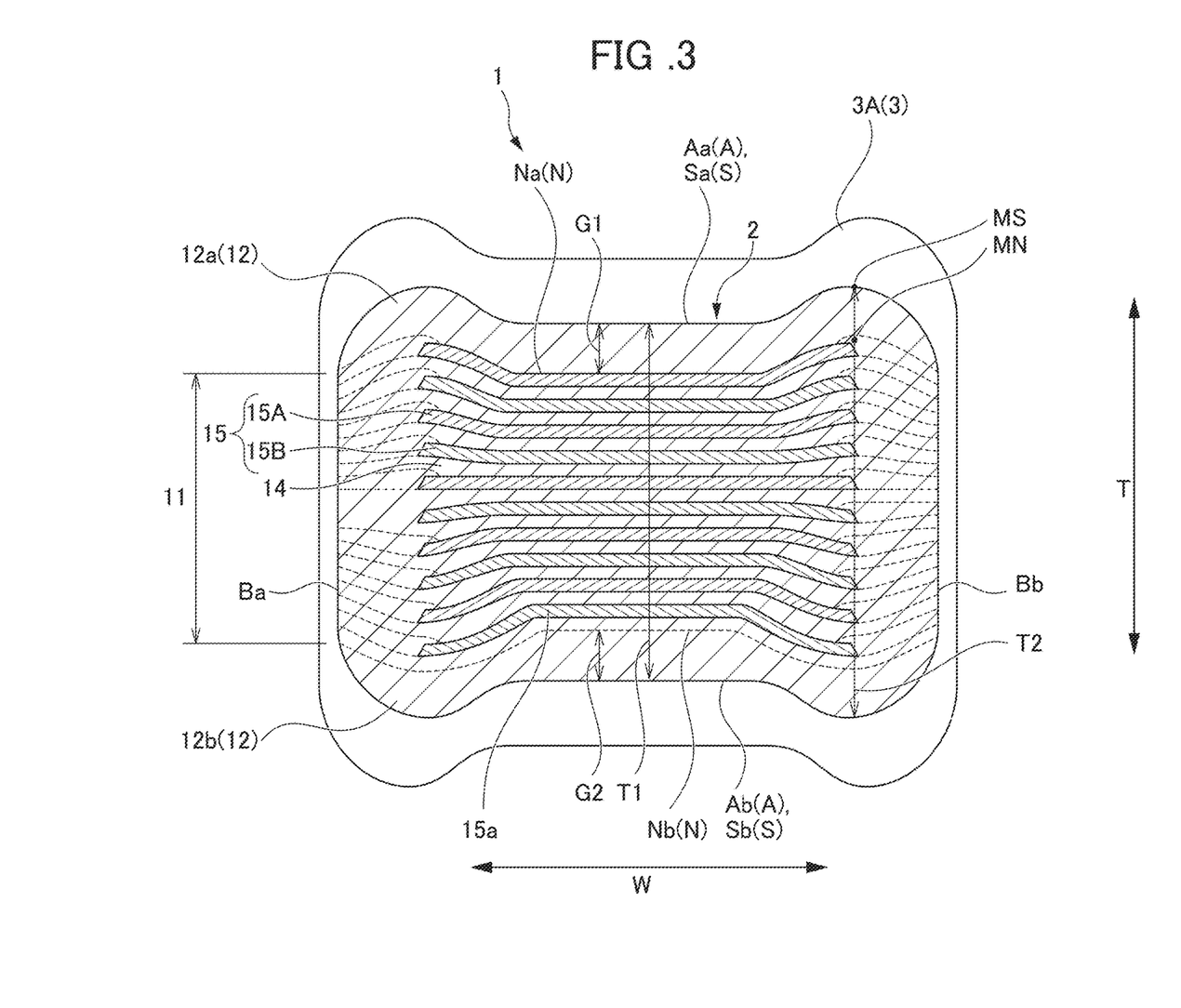
FIG. 3 is a cross-sectional view taken along the line III-III in FIG. 1 of a multilayer ceramic capacitor 1 of a preferred embodiment of the present invention.

Hereinafter, multilayer ceramic capacitor 1 according to preferred embodiments of the present invention will be described. FIG. 1 is a schematic perspective view of a multilayer ceramic capacitor 1 according to a preferred embodiment of the present invention. FIG. 2 is a cross-sectional view taken along the line II-II in FIG. 1 of the multilayer ceramic capacitor 1 of the present preferred embodiment. FIG. 3 is a cross-sectional view taken along the line III-III in FIG. 1 of the multilayer ceramic capacitor 1 of the present preferred embodiment.

Multilayer Ceramic Capacitor 1

A multilayer ceramic capacitor 1 includes a multilayer body 2, and a pair of external electrodes 3 provided at both ends of the multilayer body 2. The multilayer body 2 includes an inner layer portion 11 and outer layer portions 12. The inner layer portion 11 includes a plurality of sets of a dielectric layer 14 and a layered internal electrode 15 alternately laminated therein.

In the following description, as terms representing the orientations of the multilayer ceramic capacitor 1, a direction in which the dielectric layers 14 and the internal electrode 15 are laminated (stacked) is defined as a lamination (stacking) direction T in the multilayer ceramic capacitor 1. In the multilayer ceramic capacitor 1, a direction intersecting the lamination direction T in which the pair of external electrodes 3 are provided is defined as a length direction L. A direction intersecting both the length direction L and the lamination direction T is defined as a width direction W. It should be noted that, in the present preferred embodiment, the lamination direction T, the length direction L, and the width direction W are perpendicular or substantially perpendicular to one another.

Furthermore, FIG. 2 is a LT cross-section (second cross-section) passing through the length direction L and the lamination (stacking) direction T of the multilayer ceramic capacitor 1, and FIG. 3 is a WT cross-section (first cross-section) passing through the width direction W and the lamination direction T of the multilayer ceramic capacitor 1.

Furthermore, in the following description, among the six outer surfaces of the multilayer body 2, a pair of outer surfaces opposing each other in the lamination direction T are referred to as a first multilayer body main surface Aa and a second multilayer body main surface Ab, respectively, a pair of outer surfaces opposing each other in the width direction W are referred to as a first side surface Ba and a second side surface Bb, respectively, and a pair of outer surfaces opposing each other in the length direction L are referred to as a first end surface Ca and a second end surface Cb.

When it is not necessary to particularly distinguish between the first multilayer body main surface Aa and the second multilayer body main surface Ab, they are collectively referred to as a multilayer main surface A, when it is not necessary to particularly distinguish between the first side surface Ba and the second side surface Bb, they are collectively referred to as a main surface B, and when it is not necessary to particularly distinguish between the first end surface Ca and the second end surface Cb, they are collectively referred to as an end surface C.

Furthermore, the surface adjacent to the first multilayer body main surface Aa as the multilayer ceramic capacitor 1 overall is defined as a first main surface Sa, and the surface adjacent to the second multilayer body main surface Ab as the multilayer ceramic capacitor 1 overall is defined as a second main surface Sb. When it is not necessary to particularly distinguish between them, they are collectively referred to as a main surface S.

Furthermore, the surface adjacent to the first multilayer body main surface Aa of the inner layer portion 11 is defined as a first inner layer portion main surface Na, and the surface adjacent to the second multilayer body main surface Ab of the inner layer portion 11 is defined as a second inner layer portion main surface Nb. When it is not necessary to particularly distinguish between them, they are collectively referred to as an inner layer portion main surface N.

Multilayer Body 2

The multilayer body 2 includes the inner layer portion 11, and outer layer portions 12 on both sides in the lamination direction T of the inner layer portion 11.

The dimension of the multilayer body 2 is not particularly limited. However, it is preferable that, for example, the dimension in the length direction L is about 0.2 mm or more and about 10 mm or less, the dimension in the width direction W is about 0.1 mm or more and about 10 mm or less, and the dimension in the lamination direction T is about 0.1 mm or more and about 5 mm or less.

Inner Layer Portion 11

The inner layer portion 11 includes the plurality of sets of the dielectric layer 14 and the internal electrode 15 alternately laminated therein in the lamination direction T.

Internal Electrodes 15

The internal electrodes 15 include a plurality of first internal electrodes 15A and a plurality of second internal electrodes 15B. The first internal electrodes 15A and the second internal electrodes 15B are alternately provided. When it is not necessary to distinguish between the first internal electrode 15A and the second internal electrode 15B, they are collectively referred to as an internal electrode 15.

The internal electrodes 15 are preferably made of, for example, a metallic material such as Ni, Cu, Ag, Pd, a Ag—Pd alloy, Au, or the like. The number of internal electrodes 15 in addition to the first internal electrode 15A and the second internal electrode 15B is preferably, for example, fifteen or more and 200 or less.

The internal electrodes 15 each include an opposing portion 15a, and a lead-out portion 15b which extends from the opposing portion 15a to the end surface C, and coupled to the external electrode 3.

Dielectric Layers 14

The dielectric layers 14 are made of a ceramic material.

As the ceramic material, for example, a dielectric ceramic including $BaTiO_3$ as a main component is used.

Furthermore, as the ceramic material, those obtained by adding at least one sub-component such as, for example, Mn compounds, Fe compounds, Cr compounds, Co compounds, and Ni compounds to these main components may be used.

It should be noted that the number of dielectrics 14 in addition to the upper outer layer portion 12a and the lower outer layer portion 12b is preferably 15 or more and 700 or less, for example.

Figure 4:
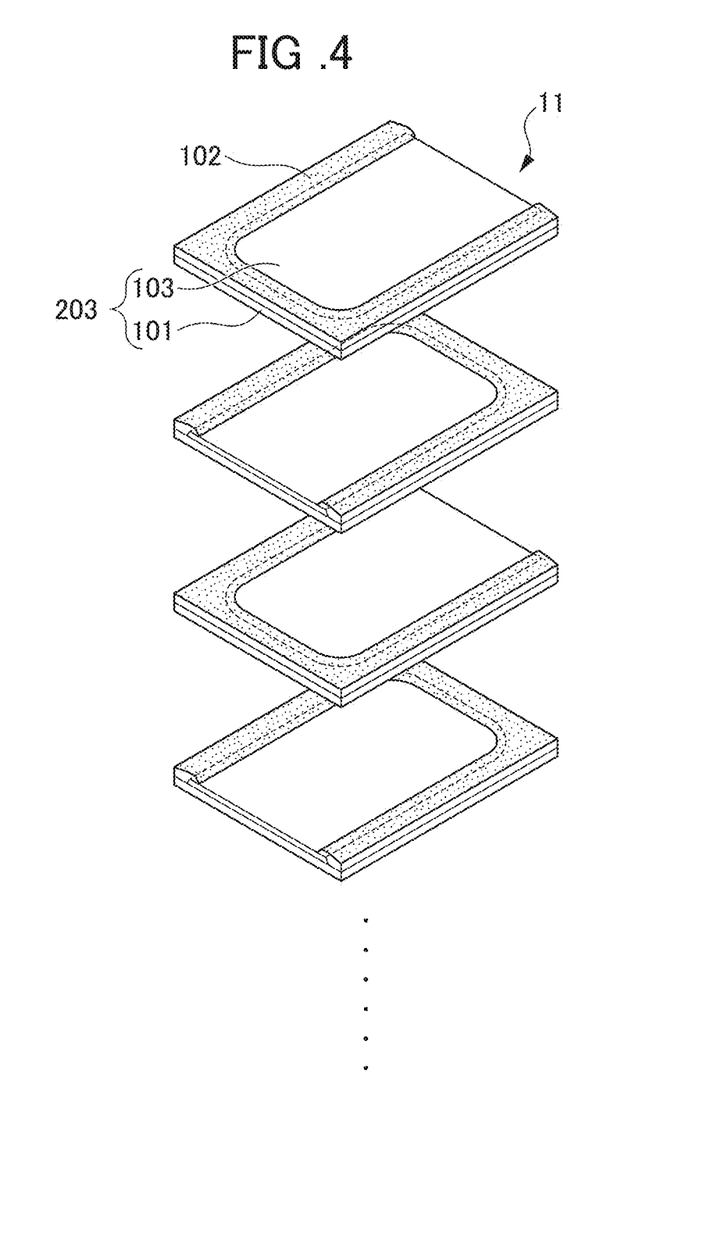
FIG. 4 is an exploded perspective view for explaining a lamination state of an inner layer portion 11.

FIG. 4 is an exploded perspective view for explaining a lamination state of the inner layer portion 11. As will be described in detail later, at the time of manufacturing the multilayer ceramic capacitor 1, a ceramic paste 102 is printed in a region in which an internal electrode pattern 103 is not disposed, on a material sheet 203 in which the internal electrode pattern 103 defining and functioning as the internal electrode 15 is printed on a ceramic green sheet 101 defining and functioning as the dielectric layer 14. Furthermore, the ceramic paste 102 also covers a peripheral edge portion of the internal electrode 15. The inner layer portion 11 is obtained by laminating the material sheet 203 in which the ceramic paste 102 is printed on the peripheral edge portion of the internal electrode 15.

Thus, since the ceramic paste 102 overlaps the internal electrode 15, and covers the peripheral edge portion of the internal electrode 15, as shown in FIGS. 2 and 3, inner layer raised portions MN are respectively provided on one side and the other side with the middle portion interposed therebetween on the inner layer portion main surface N. The inner layer raised portions MN are each raised to become thicker in the lamination direction T from the middle portion toward the outer periphery of the inner layer portion main surface N.

That is, the inner layer raised portions MN are provided at both end portions of the inner layer portion main surface N in the width direction W of the internal electrode 15, and extend in the length direction L of the inner layer portion main surface N.

Furthermore, the inner layer raised portions MN are respectively provided at both end portions in the length direction L of the opposing portion 15a of the inner layer portion main surface N, and extends in the width direction W of the inner layer portion main surface N.

Outer Layer Portion 12

The outer layer portion 12 includes an upper outer layer portion 12a provided on one side of the inner layer portion 11, and a lower outer layer portion 12b provided on the other side of the inner layer portion 11 in the lamination direction T. When it is not necessary to particularly distinguish between the upper outer layer portion 12a and the lower outer layer portion 12b, they are collectively referred to as an outer layer portion 12.

The outer layer portions 12 are each made of the same material as the dielectric layer 14 of the inner layer portion 11. Furthermore, each of the thicknesses of the outer layer portions 12 is, for example, about 20 μm or less, and more preferably about 10 μm or less.

It should be noted that the upper outer layer portion 12a and the lower outer layer portion 12b are respectively provided on both sides of the inner layer portion in the lamination direction. The upper outer layer portion 12a and the lower outer layer portion 12b respectively have constant or substantially constant thicknesses G1 and G2. In the present preferred embodiment, G1 and G2 have the same or substantially the same thickness. However, the present invention is not limited thereto, and may be different from each other.

Therefore, even in the multilayer body 2 in which the upper outer layer portion 12a and the lower outer layer portion 12b are provided, due to the inner layer raised portions MN, the multilayer body main surface A includes multilayer body raised portions MS at one side and the other side with the middle portion interposed therebetween. The multilayer body raised portions MS are each raised to become thicker in the lamination direction T from the middle portion toward the outer periphery of the multilayer body main surface A.

That is, the multilayer body raised portions MS are provided at locations in the multilayer body main surface A where both end portions in the width direction W of the internal electrodes 15 are provided along the lamination direction T, and extend in the length direction L of the multilayer body main surface A.

Furthermore, the multilayer body raised portions MS are also provided at locations in the multilayer body main surface A where both end portions in the length direction L of the opposing portions 15a are provided along the lamination direction T, and extend in the width direction W of the multilayer body main surface A.

External Electrodes 3

As described above, the end portion of the lead-out portion 15b of the first internal electrode 15A is exposed to the first end surface Ca, and is electrically connected to the first external electrode 3A. The end of the lead-out portion 15b of the second internal electrode 15B is exposed to the second end surface Cb, and is electrically connected to the second external electrode 3B. Thus, a plurality of capacitor elements are electrically connected in parallel between the first external electrode 3A and the second external electrode 3B.

Furthermore, the external electrodes 3 cover not only the end surface C, but also portions adjacent to the end surface C of the multilayer body main surface A and the side surface B, and further cover portions of the multilayer body raised portions MS.

Furthermore, even in the multilayer ceramic capacitor 1 in which the external electrodes 3 are provided, due to the inner layer raised portions MN and the multilayer body raised portion MS, the two main surfaces S opposed to each other in the lamination direction T each include raised portions M at one side and the other side with the middle portion of the main surface S interposed therebetween. The raised portions M are each raised to become thicker in the lamination direction T as from the middle portion toward the outer periphery of the main surface S.

Specifically, the raised portions M are provided at locations in the main surface S where both end portions in the width direction W of the internal electrodes 15 are provided along the lamination direction T, and extend in the length direction L of the main surface S. Furthermore, the raised portions M are also provided at locations in the main surface S where both end portions in the length direction L of the opposing portions 15a are provided along the lamination direction T, and extend in the width direction W of the main surface S.

Here, for example, in a case in which the outer peripheral portion of the multilayer ceramic capacitor is thinner than the central portion thereof, when the multilayer ceramic capacitor is provided on a board, the multilayer ceramic capacitor is likely to shift left and right, or front and rear, a result of which the posture is not stable.

However, according to the multilayer ceramic capacitor 1, it is possible to stabilize the posture, without the multilayer ceramic capacitor 1 shifting left and right, or front and rear when provided on the substrate.

Furthermore, the end portions of the lead-out portions 15b of the internal electrodes 15 exposed to the end surface C are covered with the external electrode 3. Here, there is also a possibility that moisture and water vapor penetrates from the boundary portion between the external electrode 3 and the multilayer body 2. However, in the present preferred embodiment, the external electrode 3 covers not only the end surface C, but also extends to the multilayer body main surface A and covers the portion of the multilayer body raised portion MS.

Therefore, even when moisture enters the boundary portion between the multilayer body 2 and the external electrode 3 from the main surface S, the multilayer body raised portion MS is provided in the interior of the gap. Therefore, it is difficult for moisture to enter the internal electrode 15 by passing over the multilayer body raised portion MS and going around the end surface C. Therefore, the intrusion of moisture into the boundary portion between the internal electrode 15 and the dielectric 14 is reduced or prevented.

Furthermore, in the multilayer ceramic capacitors 1 of the present preferred embodiment as shown in FIG. 3, in the portion in the middle in the length direction L where the external electrodes 3 are not provided, the thickness in the lamination direction T at the middle portion in the width direction W is defined as T1, and the thickness in the lamination direction T at the raised portion M is defined as T2. In this case, the relationship of T1 and T2 is T1<T2, and the difference of T2−T1 is, for example, about 4% to about 40% with respect to the thickness of the outer layer portion 12 (i.e., G1 or G2).

Since the difference of T2−T1 is, for example, about 4% or more with respect to the total thickness of the outer layer portion 12, the stability of the mounting posture of the multilayer ceramic capacitor 1 is sufficiently ensured. Furthermore, since the difference of T2−T1 is, for example, about 40% or less, the thickness of the multilayer ceramic capacitor 1 does not become extremely thick, such that the space efficiency at the time of mounting is not significantly reduced.

Specifically, the difference of T2−T1 is, for example, about 2 μm or more and about 50 μm or less. Since the difference of T2−T1 is, for example, about 2 μm or more, the stability of the mounting attitude of the multilayer ceramic capacitor 1 is sufficiently ensured. Furthermore, since the difference of T2−T1 is, for example, about 50 μm or less, the thickness of the multilayer ceramic capacitor 1 does not become extremely thick, such that the space efficiency at the time of mounting is not significantly reduced.

Furthermore, in the present preferred embodiment, the relationship between the thickness T4 in the lamination direction T of the raised portion M in the LT cross-section shown in FIG. 2, and the thickness T2 in the lamination direction T of the raised portion M in the WT cross-section shown in FIG. 3 is T4<T2.

The reason for this is as follows. That is, in the raised portion M shown in the LT cross-section of FIG. 2, the overlapping of the ceramic paste is provided in every other internal electrode 15. In the raised portion M shown in the WT cross-section of FIG. 3, the overlapping of the ceramic paste is provided in every internal electrode 15.

Therefore, the thickness T2 of the raised portion M shown in the WT cross-section of FIG. 3 is thicker than the thickness T4 of the raised portion M shown in the LT cross-section of FIG. 2.

Furthermore, as shown in FIG. 2, when the thickness in the lamination direction T at the middle portion in the length direction L of the multilayer body 2, and the thickness in the lamination direction T at both end portions in the length direction L are respectively defined as T3 and T5, their relationship is T5<T3<T4.

Method of Manufacturing Multilayer Ceramic Capacitor 1

Figure 5:
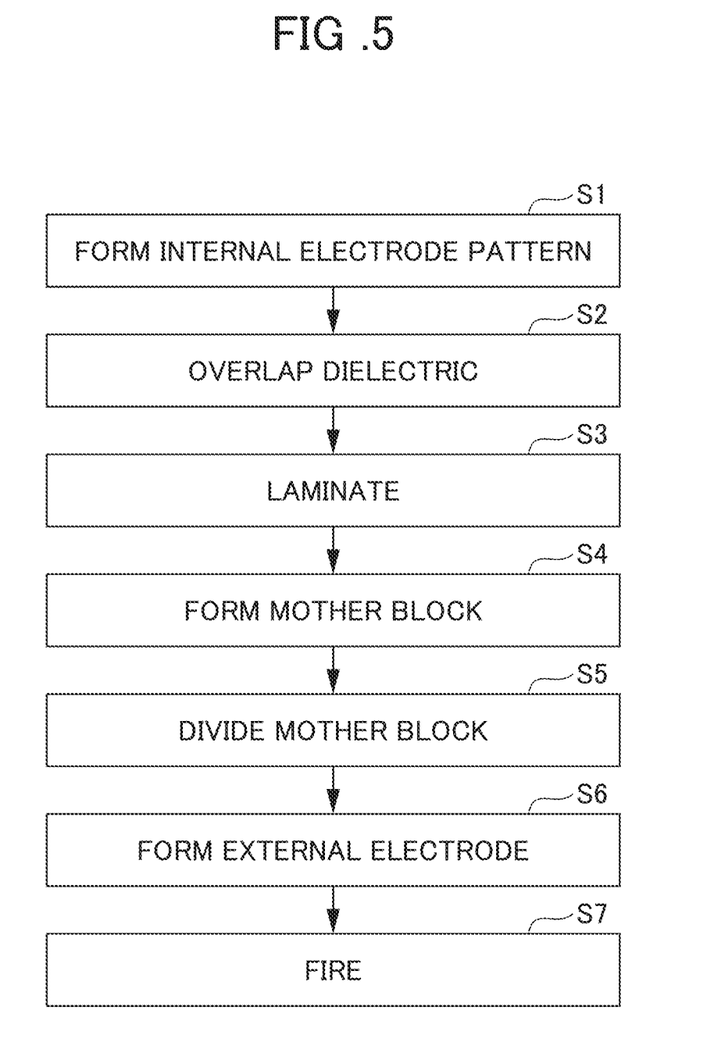
FIG. 5 provides a flowchart showing a method of manufacturing the multilayer ceramic capacitor 1.

Next, a non-limiting example of a method of manufacturing the multilayer ceramic capacitor 1 of the present preferred embodiment will be described. FIG. 5 is a flowchart showing a method of manufacturing the multilayer ceramic capacitor 1.

Internal Electrode Pattern Forming Step S1

Figure 6:
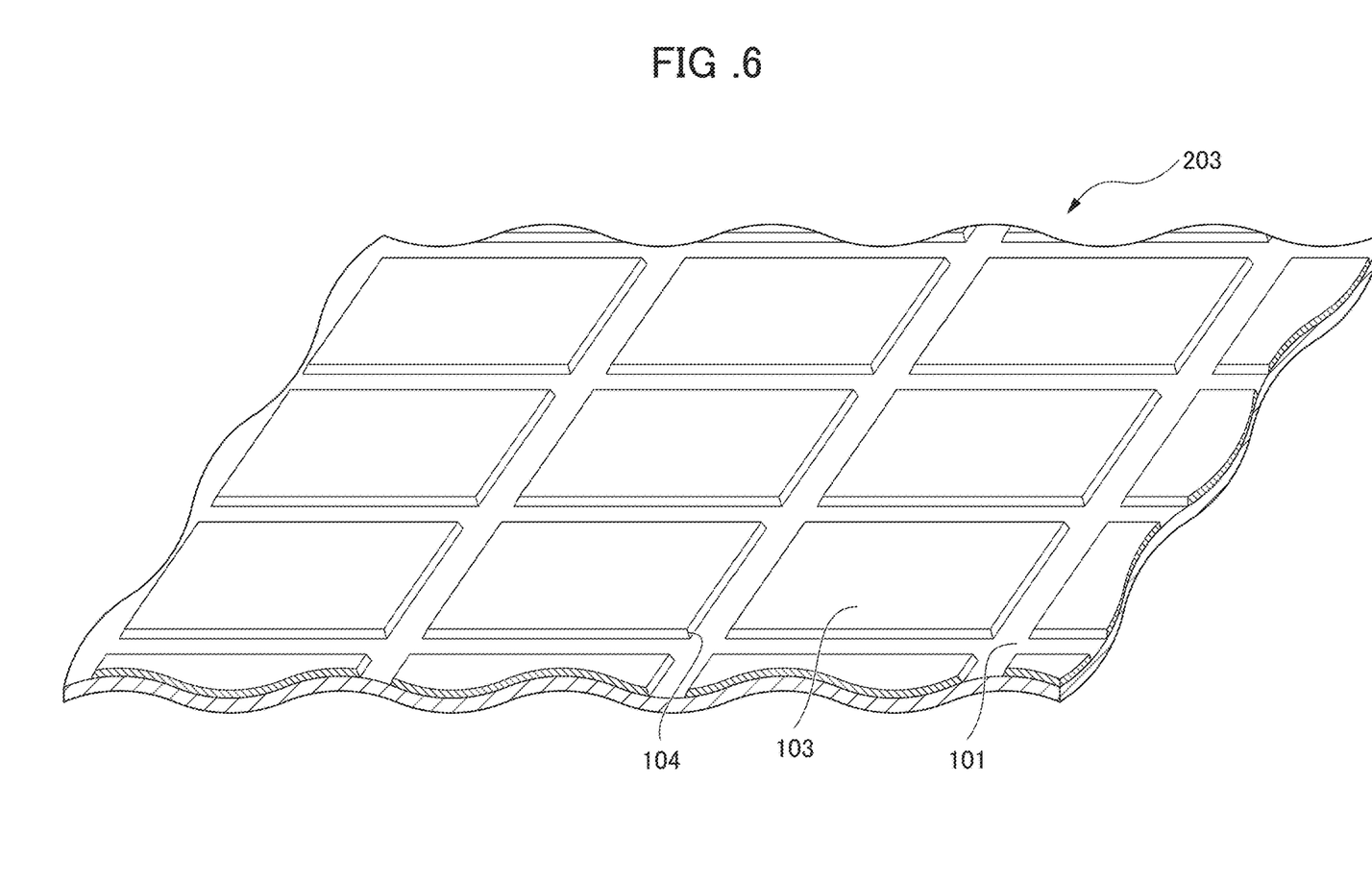
FIG. 6 is a perspective view of a material sheet 203 on which an internal electrode pattern 103 defining and functioning as an internal electrode 15 is printed on the surface of a ceramic green sheet 101.

First, the internal electrode pattern 103 defining and functioning as the internal electrode 15 is formed with a conductive paste on the ceramic green sheet 101 defining and functioning as the dielectric 14.

FIG. 6 is a perspective view of the material sheet 203 on which the internal electrode pattern 103 which becomes the internal electrode 15 is printed on the surface of the ceramic green sheet 101.

Ceramic Green Sheet 101

The ceramic green sheet 101 is a strip-shaped sheet produced by a ceramic slurry including a ceramic power, a binder, and a solvent being formed in a sheet shape on a carrier film using a die coater, gravure coater, a microgravure coater, or the like.

Internal Electrode Pattern 103

The internal electrode pattern 103 is formed by, for example, screen printing, gravure printing, relief printing, or the like.

Here, in the internal electrode pattern 103, a level difference 104 is formed on the ceramic green sheet 101 due to the thickness of the internal electrode pattern 103.

In the present preferred embodiment, the level difference 104 is a sloped surface.

Overlapping Dielectric Providing Step S2

Figure 7:
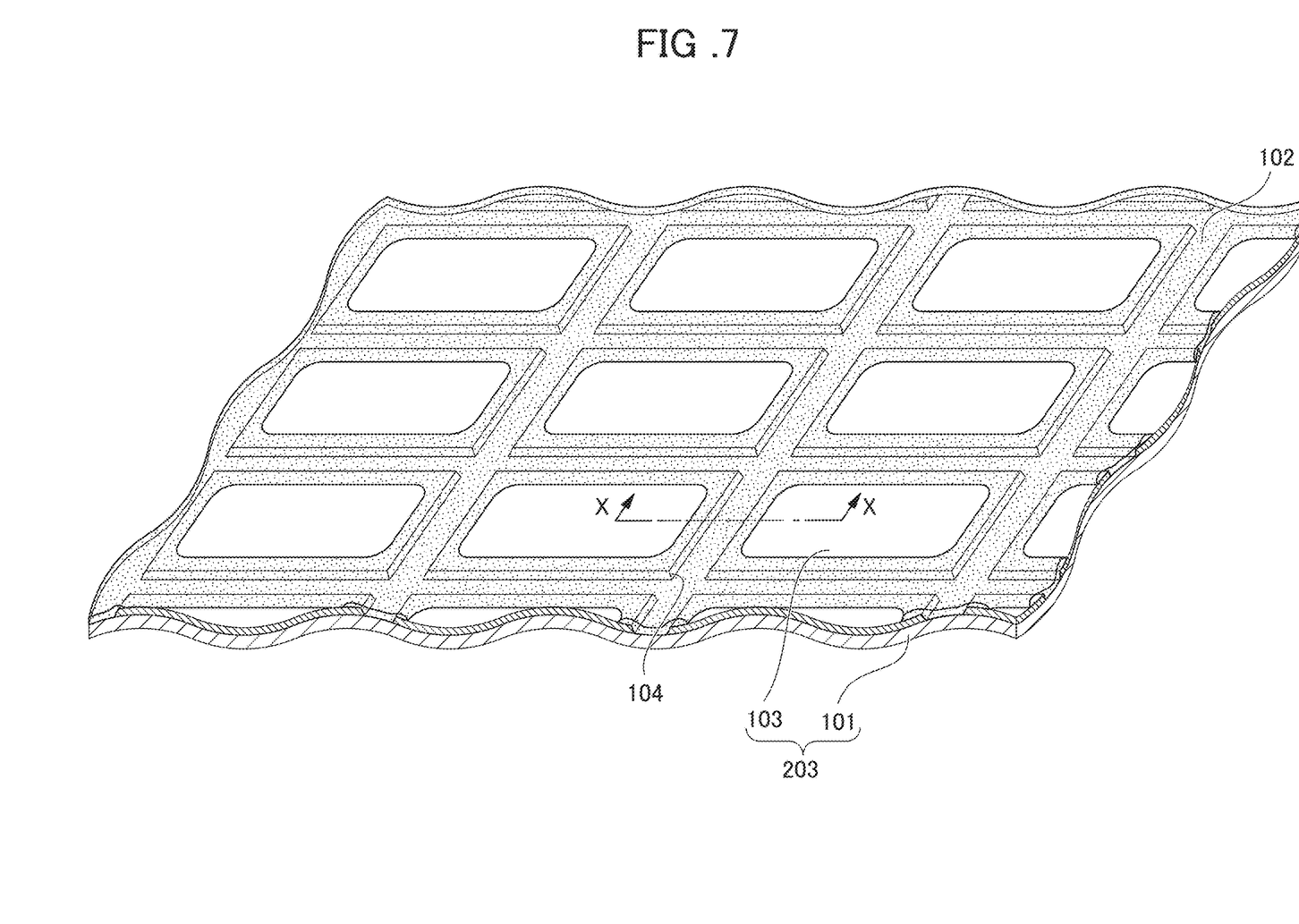
FIG. 7 is a perspective view showing a state in which a ceramic paste 102 is provided on the material sheet 203.

Next, the ceramic paste 102 is provided on the material sheet 203. The ceramic paste 102 fills the level difference 104 due to the thickness of the internal electrode pattern 103, and forms a dielectric layer overlapping the outer peripheral portion of the internal electrode pattern 103. Furthermore, the ceramic paste 102 to form the dielectric layer on the outer peripheral portion of which the internal electrode pattern 103 is to be formed may be provided first on the material sheet 203, and the internal electrode may be provided so as to overlap the internal electrode pattern 103.

Figure 8:
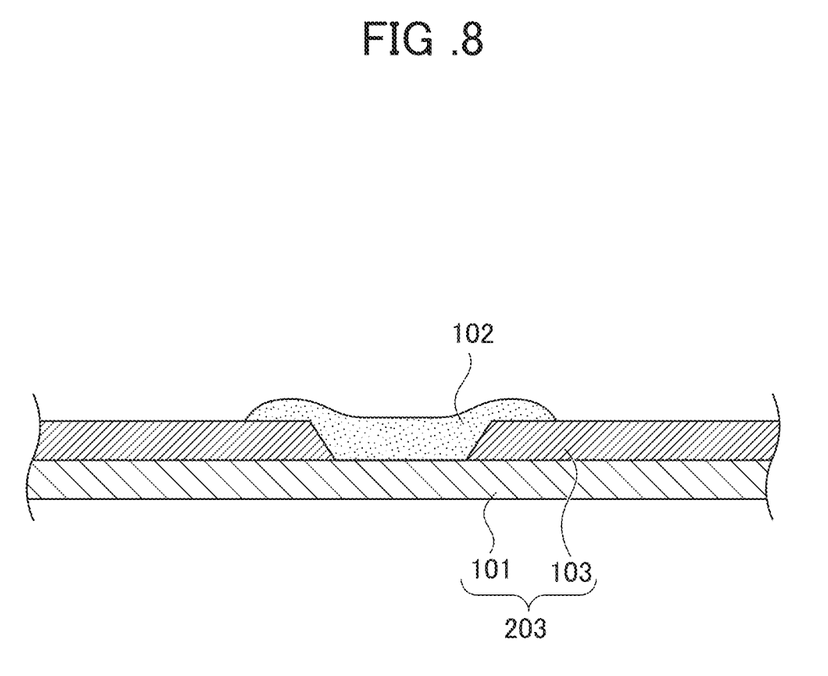
FIG. 8 is a partial cross-sectional view of FIG. 7.

FIG. 7 is a perspective view showing a state in which the ceramic paste 102 is provided on the material sheet 203. FIG. 8 is a cross-sectional view taken along line X-X of FIG. 7.

It should be noted that the ceramic paste 102 is applied by, for example, screen printing, gravure printing, relief printing, or the like. The ceramic paste 102 may have different component ratios from the dielectric as the material of the ceramic green sheet 101, may have the same component ratios, or may include different components.

The ceramic paste 102 is applied so as to overlap the peripheral edge portion of the internal electrode 15 with a predetermined width. The width of the overlap is, for example, about 180 μm or less, and preferably about 20 to about 140 μm.

Furthermore, as shown in FIG. 8, since the level difference 104 of the internal electrode pattern 103 is a sloped surface, the ceramic paste 102 gradually extends over the internal electrode pattern 103. Therefore, the top surface of the ceramic paste 102 becomes smooth.

Lamination Step S3

Figure 9:
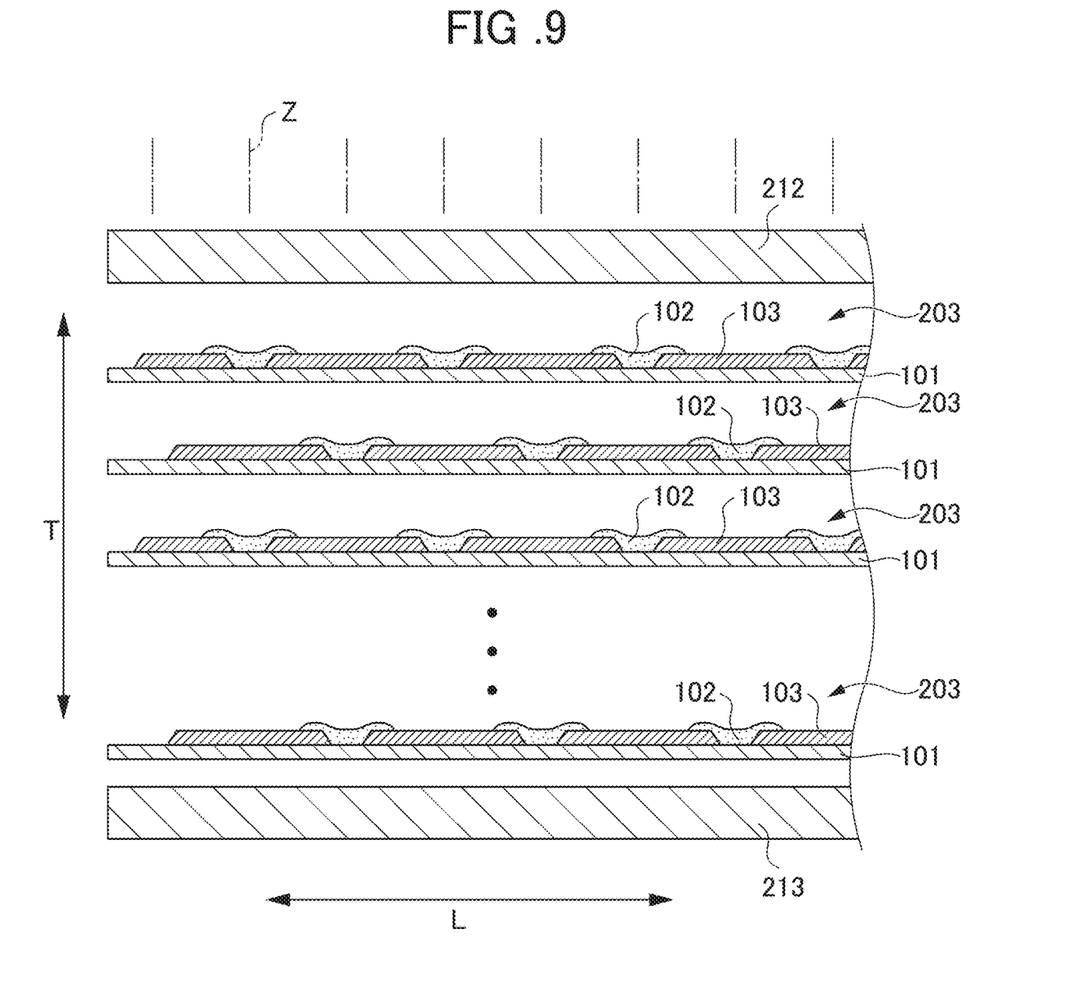
FIG. 9 is a diagram for explaining a lamination state of the material sheet 203.

FIG. 9 is a diagram for explaining a lamination state of the material sheet 203. As shown in FIG. 9, the material sheets 203 are provided such that the adjacent internal electrode patterns 103 in the lamination direction T are alternately shifted in the length direction L.

Furthermore, an upper outer layer portion ceramic green sheet 212 defining and functioning as the upper outer layer portion 12a is stacked on one side of the plurality of stacked material sheets 203, and a lower outer layer portion ceramic green sheet 213 defining and functioning as the lower outer layer portion 12b is stacked on the other side of the plurality of stacked material sheets 203.

Mother Block Forming Step S4

Subsequently, the upper outer layer portion ceramic green sheet 212, a plurality of stacked material sheets 203, and the lower outer layer portion ceramic green sheet 213 are subjected to thermocompression bonding.

Mother Block Dividing Step S5

Next, the mother block is cut at the position Z shown in FIG. 9. Although only the cutting position Z in the length direction L is shown, the multilayer body 2 is also cut in the length direction L perpendicular or substantially perpendicular to the position Z extending in the width direction, such that a plurality of rectangular multilayer bodies 2 are manufactured.

In this state, as described above, the inner layer portion main surface N which is an outer surface of the inner layer portion 11 in the lamination direction T includes inner layer raised portions MN at one side and the other side with the middle portion interposed therebetween, and the inner layer raised portions MN are each raised to become thicker in the lamination direction T from the middle portion toward the outer periphery of the inner layer portion main surface N.

Furthermore, even in the multilayer body 2, the multilayer body main surface A includes multilayer body raised portions MS at one side and the other side with the middle portion interposed therebetween, and the multilayer body raised portions MS are each raised to become thicker in the lamination direction T from the middle portion toward the outer periphery of the multilayer body main surface A.

External Electrode Forming Step S6

Next, the external electrodes 3 are formed at both ends of the multilayer body 2, respectively.

Firing Step S7

Then, the resultant body is heated for a predetermined time in a nitrogen atmosphere at a set firing temperature. As a result, the external electrodes 3 are burned onto the multilayer body 2 to manufacture the multilayer ceramic capacitor 1 shown in FIG. 1.

Furthermore, even in the multilayer ceramic capacitor 1, the two main surfaces S opposed to each other in the lamination direction T each include raised portions M at one side and the other side with the middle portion of the main surface S interposed therebetween, and the raised portions M are each raised to become thicker in the lamination direction T from the middle portion toward the outer periphery of the main surface S.

In this way, by allowing the ceramic paste 102 to cover the peripheral edge portions of the internal electrodes 15 and overlap the internal electrodes 15, the raised portions M are provided at the location in the main surface S where both end portions in the width direction W of the internal electrodes 15 are provided along the lamination direction T, and the location in the main surface S where the both end portions in the length direction L of the opposing portion 15a are provided along the lamination direction T.

Therefore, the raised portions M are easily and efficiently manufactured.

Furthermore, the height of each of the raised portions M is determined by the amount of the overlapped ceramic paste 102. T2 and T4 are adjusted to a preferable or optimum value by adjusting the amount of the overlapping ceramic paste 102.

While the preferred embodiments of the present invention have been described above, the present invention is not limited thereto, and various modifications as shown below, for example, are possible.

For example, the raised portions M can be formed by a method other than the method of allowing the ceramic paste 102 to cover the peripheral edge portions of the internal electrodes 15 and overlap the internal electrodes 15 as described in the present preferred embodiment. By way of example, it can also be formed by using an outer layer portion including a raised portion. Alternatively, an outer layer portion may be used which further includes a raised portion made by causing the ceramic paste 102 to cover the peripheral edge portions of the internal electrodes 15 and overlap the internal electrodes 15.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body including a first surface and a second surface opposing each other in a lamination direction, a third surface and a fourth surface opposing each other in a length direction which intersects the lamination direction, and a fifth surface and a sixth surface opposing each other in a width direction which intersects the lamination direction and the length direction; and
    external electrodes respectively on the third and fourth surfaces of the multilayer body; wherein
    the multilayer body includes a plurality of internal electrodes including an internal electrode exposed on the third surface;
    the first surface includes raised portions respectively on one side and another side with a middle portion of the first surface interposed therebetween;
    each of the raised portions becomes thicker in the lamination direction from a vicinity of the middle portion toward an outer periphery of the first surface;
    a distance in the lamination direction between an internal electrode included in the plurality of internal electrodes and located adjacent to the first surface and an internal electrode included in the plurality of internal electrodes and located adjacent to the second surface in the raised portions is greater than a distance in the lamination direction between the internal electrode adjacent to the first surface and the internal electrode adjacent to the second surface in the middle portion; and
    in a cross-section in the length direction and the lamination direction at the middle portion, a thickness in the lamination direction of the raised portions is greater than a thickness in the lamination direction at the third surface.

2. The multilayer ceramic capacitor according to claim 1, wherein the raised portions are provided at locations in the first surface where both end portions in the width direction of the plurality of internal electrodes are provided along the lamination direction, and extend in the length direction of the first surface.

3. The multilayer ceramic capacitor according to claim 1, wherein
    the plurality of internal electrodes include opposing portions each of which faces opposing portions of adjacent internal electrodes in the lamination direction, and lead-out portions each of which extends from one side of the respective opposing portion in the length direction to one of the two external electrodes; and
    the raised portions are at locations in the first surface where both end portions in the length direction of the opposing portions are provided along the lamination direction, and extend in the width direction of the first surface.

4. The multilayer ceramic capacitor according to claim 1, wherein
the multilayer body includes outer layer portions on both sides in the lamination direction of an inner layer portion; and
when, in a first cross-section through the width direction and the lamination direction at a middle portion in the length direction of the multilayer body, a thickness in the lamination direction at a middle portion in the width direction of the multilayer body is defined as T1, and a thickness in the lamination direction at the raised portion is defined as T2, a relationship of T1 and T2 is T1<T2, and a difference of T2−T1 is about 4% to about 40% with respect to a thickness of the outer layer portions.

5. The multilayer ceramic capacitor according to claim 1, wherein, when, in a first cross-section through the width direction and the lamination direction at a middle portion in the length direction of the multilayer body, a thickness in the lamination direction at the middle portion in the width direction of the multilayer body is defined as T1, and a thickness in the lamination direction at one or more of the raised portions is defined as T2, a relationship of T1 and T2 is T1<T2, and a difference of T2−T1 is about 2 µm or more and about 50 µm or less.

6. The multilayer ceramic capacitor according to claim 1, wherein, when, in a first cross-section through the width direction and the lamination direction at a middle portion in the length direction of the multilayer body, a thickness in the lamination direction at one or more of the raised portions of the multilayer body is defined as T2, and in a second cross-section through the lamination direction and the length direction at a middle portion in the width direction of the multilayer body, a thickness in the lamination direction at one or more of the raised portions is defined as T4, a relationship of T4 and T2 is T4<T2.

7. The multilayer ceramic capacitor according to claim 1, wherein, when, in a second cross-section through the lamination direction and the length direction at a middle portion in the width direction of the multilayer body, a thickness in the lamination direction at a middle portion in the length direction of the multilayer body is defined as T3, a thickness in the lamination direction at one or more of the raised portions of the multilayer body is defined as T4, and a thickness in the lamination direction at both end portions of the multilayer body in the length direction is defined as T5, a relationship of T3, T4, and T5 is T5<T3<T4.

8. A multilayer ceramic capacitor comprising:
a multilayer body including a first surface and a second surface opposing each other in a lamination direction, a third surface and a fourth surface opposing each other in a length direction which intersects the lamination direction, and a fifth surface and a sixth surface opposing each other in a width direction which intersects the lamination direction and the length direction; and
external electrodes respectively on the third and fourth surfaces of the multilayer body; wherein
the multilayer body includes an internal electrode exposed on the third surface;
the first surface includes raised portions respectively on one side and another side with a middle portion of the first surface interposed therebetween;
each of the raised portions becomes thicker in the lamination direction from a vicinity of the middle portion toward an outer periphery of the first surface;
a distance in the lamination direction between an internal electrode included in the plurality of internal electrodes and located adjacent to the first surface and an internal electrode included in the plurality of internal electrodes and located adjacent to the second surface in the raised portions is greater than a distance in the lamination direction between the internal electrode adjacent to the first surface and the internal electrode adjacent to the second surface in the middle portion; and
when, in a first cross-section through the width direction and the lamination direction at a middle portion in the length direction of the multilayer body, a thickness in the lamination direction at one or more of the raised portions of the multilayer body is defined as T2, and in a second cross-section through the lamination direction and the length direction at a middle portion in the width direction of the multilayer body, a thickness in the lamination direction at one or more of the raised portions is defined as T4, a relationship of T4 and T2 is T4<T2.

9. The multilayer ceramic capacitor according to claim 8, wherein the raised portions are provided at locations in the first surface where both end portions in the width direction of the plurality of internal electrodes are provided along the lamination direction, and extend in the length direction of the first surface.

10. The multilayer ceramic capacitor according to claim 8, wherein
the plurality of internal electrodes include opposing portions each of which faces opposing portions of adjacent internal electrodes in the lamination direction, and lead-out portions each of which extends from one side of the respective opposing portion in the length direction to one of the two external electrodes; and
the raised portions are at locations in the first surface where both end portions in the length direction of the opposing portions are provided along the lamination direction, and extend in the width direction of the first surface.

11. The multilayer ceramic capacitor according to claim 8, wherein
the multilayer body includes outer layer portions on both sides in the lamination direction of an inner layer portion; and
when, in a first cross-section through the width direction and the lamination direction at a middle portion in the length direction of the multilayer body, a thickness in the lamination direction at a middle portion in the width direction of the multilayer body is defined as T1, a relationship of T1 and T2 is T1<T2, and a difference of T2−T1 is about 4% to about 40% with respect to a thickness of the outer layer portions.

12. The multilayer ceramic capacitor according to claim 8, wherein, when, in the first cross-section through the width direction and the lamination direction at a middle portion in the length direction of the multilayer body, a thickness in the lamination direction at the middle portion in the width direction of the multilayer body is defined as T1, a relationship of T1 and T2 is T1<T2, and a difference of T2−T1 is about 2 µm or more and about 50 µm or less.

13. The multilayer ceramic capacitor according to claim 8, wherein, when, in a second cross-section through the lamination direction and the length direction at a middle portion in the width direction of the multilayer body, a thickness in the lamination direction at a middle portion in the length direction of the multilayer body is defined as T3, a thickness in the lamination direction at both end portions of the multilayer body in the length direction is defined as T5; and a relationship of T3, T4, and T5 is T5<T3<T4.

14. A multilayer ceramic capacitor comprising:
a multilayer body including a first surface and a second surface opposing each other in a lamination direction, a third surface and a fourth surface opposing each other in a length direction which intersects the lamination direction, and a fifth surface and a sixth surface opposing each other in a width direction which intersects the lamination direction and the length direction; and
external electrodes respectively on the third and fourth surfaces of the multilayer body; wherein
the multilayer body includes an internal electrode exposed on the third surface;
the first surface includes raised portions respectively on one side and another side with a middle portion of the first surface interposed therebetween;
each of the raised portions becomes thicker in the lamination direction from a vicinity of the middle portion toward an outer periphery of the first surface;
a distance in the lamination direction between an internal electrode included in the plurality of internal electrodes and located adjacent to the first surface and an internal electrode included in the plurality of internal electrodes and located adjacent to the second surface in the raised portions is greater than a distance in the lamination direction between the internal electrode adjacent to the first surface and the internal electrode adjacent to the second surface in the middle portion; and
when, in a first cross-section through the width direction and the lamination direction at a middle portion in the length direction of the multilayer body, a thickness in the lamination direction at the middle portion in the width direction of the multilayer body is defined as T1, and a thickness in the lamination direction at one or more of the raised portions is defined as T2, a relationship of T1 and T2 is T1<T2, and a difference of T2−T1 is about 2 µm or more and about 50 µm or less.

15. The multilayer ceramic capacitor according to claim 14, wherein the raised portions are provided at locations in the first surface where both end portions in the width direction of the plurality of internal electrodes are provided along the lamination direction, and extend in the length direction of the first surface.

16. The multilayer ceramic capacitor according to claim 14, wherein
the plurality of internal electrodes include opposing portions each of which faces opposing portions of adjacent internal electrodes in the lamination direction, and lead-out portions each of which extends from one side of the respective opposing portion in the length direction to one of the two external electrodes; and
the raised portions are at locations in the first surface where both end portions in the length direction of the opposing portions are provided along the lamination direction, and extend in the width direction of the first surface.

17. The multilayer ceramic capacitor according to claim 14, wherein
the multilayer body includes outer layer portions on both sides in the lamination direction of an inner layer portion; and
the difference of T2−T1 is about 4% to about 40% with respect to a thickness of the outer layer portions.

18. The multilayer ceramic capacitor according to claim 14, wherein
when, in a second cross-section through the lamination direction and the length direction at a middle portion in the width direction of the multilayer body, a thickness in the lamination direction at one or more of the raised portions is defined as T4; and
a relationship of T4 and T2 is T4<T2.

19. The multilayer ceramic capacitor according to claim 14, wherein, when, in a second cross-section through the lamination direction and the length direction at a middle portion in the width direction of the multilayer body, a thickness in the lamination direction at a middle portion in the length direction of the multilayer body is defined as T3, a thickness in the lamination direction at one or more of the raised portions of the multilayer body is defined as T4, a thickness in the lamination direction at both end portions of the multilayer body in the length direction is defined as T5, and a relationship of T3, T4, and T5 is T5<T3<T4.

* * * * *